(12) United States Patent
Araki et al.

(10) Patent No.: US 12,537,101 B2
(45) Date of Patent: Jan. 27, 2026

(54) SYSTEM FOR SUPPORTING DECISION-MAKING REGARDING ASSESSMENT USING A MACHINE LEARNING-TRAINED MODEL, ASSESSMENT SUPPORT METHOD, AND RECORDING MEDIUM

(71) Applicant: NEC Corporation, Tokyo (JP)

(72) Inventors: Kenji Araki, Tokyo (JP); Yutaka Uno, Tokyo (JP); Junichi Yahara, Tokyo (JP); Kosuke Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 14 days.

(21) Appl. No.: 18/563,406

(22) PCT Filed: May 27, 2021

(86) PCT No.: PCT/JP2021/020254
§ 371 (c)(1),
(2) Date: Nov. 22, 2023

(87) PCT Pub. No.: WO2022/249407
PCT Pub. Date: Dec. 1, 2022

(65) Prior Publication Data
US 2024/0242838 A1  Jul. 18, 2024

(51) Int. Cl.
*G16H 50/20* (2018.01)
*G16H 10/60* (2018.01)

(52) U.S. Cl.
CPC ............ *G16H 50/20* (2018.01); *G16H 10/60* (2018.01)

(58) Field of Classification Search
CPC ......... G16H 50/20; G16H 10/60; G16H 50/70
See application file for complete search history.

(56) References Cited

U.S. PATENT DOCUMENTS 10,769,241 B1 * 9/2020 McNair ................. G16H 10/60
2010/0332143 A1 * 12/2010 Onell .................... G01N 33/564
706/46

(Continued)

FOREIGN PATENT DOCUMENTS

| JP | 2000-259712 A | 9/2000 |
|---|---|---|
| JP | 2003-122845 A | 4/2003 |
| WO | 2020/084734 A1 | 4/2020 |

OTHER PUBLICATIONS

A Critical Review of Recurrent Neural Networks for Sequence Learning, by Zachary C. Lipton, John Berkowitz, Charles Elkan, arXiv:1506.00019v4 [cs.LG] Oct. 17, 2015 (Year: 2015).*

(Continued)

*Primary Examiner* — Sun M Li
(74) *Attorney, Agent, or Firm* — Sughrue Mion, PLLC

(57) ABSTRACT

An assessment support system includes: an assessment prediction unit that predicts, based on patient information about a target patient who is a creation target for an assessment in a nursing record, an assessment vector obtained by vectorizing the assessment of the target patient, as a prediction assessment vector; a degree-of-similarity calculation unit that calculates a degree of similarity of the assessment vector to the prediction assessment vector, based on a relationship between the predicted prediction assessment vector and the assessment vector of a patient having the assessment recorded in the nursing record; and a search unit that searches for and outputs at least one similar patient who is similar to the target patient, based on the degree of similarity.

7 Claims, 5 Drawing Sheets

(56) References Cited

U.S. PATENT DOCUMENTS

| | | | | |
|---|---|---|---|---|
| 2012/0166208 A1* | 6/2012 | Gillam | ................... | G16H 50/70 |
| | | | | 705/2 |
| 2013/0197938 A1* | 8/2013 | Bayouk | ................. | G16H 10/60 |
| | | | | 705/3 |
| 2014/0257047 A1* | 9/2014 | Sillay | ...................... | H04L 63/10 |
| | | | | 600/595 |
| 2016/0203287 A1* | 7/2016 | Chen | ...................... | G16H 50/30 |
| | | | | 705/3 |
| 2016/0237493 A1* | 8/2016 | Brandon | ................ | G16B 25/00 |
| 2020/0113524 A1* | 4/2020 | Benson | .................. | G16H 50/20 |
| 2021/0343413 A1 | 11/2021 | Kosaka et al. | | |
| 2022/0344051 A1* | 10/2022 | Lure | ...................... | G16H 20/10 |
| 2023/0377748 A1* | 11/2023 | Yang | ........................ | G06N 3/08 |

OTHER PUBLICATIONS

Semi-Supervised Deep Learning Approach for Transportation Mode Identification Using GPS Trajectory Data, by Sina Dabiri, Dec. 11, 2018 (Year: 2018).*

T. I. Alshwaheen, Y. W. Hau, N. Ass'Ad and M. M. Abualsamen, "A Novel and Reliable Framework of Patient Deterioration Prediction in Intensive Care Unit Based on Long Short-Term Memory-Recurrent Neural Network," in IEEE Access, vol. 9, pp. 3894-3918, 2021, doi: 10.1109/ACCESS.2020.3047186. (Year: 2021).*

Deasy J, Liò P, Ercole A. Dynamic survival prediction in intensive care units from heterogeneous time series without the need for variable selection or curation. Sci Rep. Dec. 17, 2020;10(1):22129. doi: 10.1038/s41598-020-79142-z. PMID: 33335183; PMCID: PMC7747558. (Year: 2020).*

Rongali S, Rose AJ, McManus DD, Bajracharya AS, Kapoor A, Granillo E, Yu H. Learning Latent Space Representations to Predict Patient Outcomes: Model Development and Validation. J Med Internet Res. Mar. 23, 2020;22(3):e16374. doi: 10.2196/16374. PMID: 32202503; PMCID: PMC7136840. (Year: 2020).*

Submitted on May 14, 2020] Patient Similarity Analysis with Longitudinal Health Data Ahmed Allam, Matthias Dittberner, Anna Sintsova, Dominique Brodbeck, Michael Krauthammer (Year: 2020).*

International Search Report for PCT Application No. PCT/JP2021/020254, mailed on Aug. 17, 2021.

\* cited by examiner

SYSTEM FOR SUPPORTING DECISION-MAKING REGARDING ASSESSMENT USING A MACHINE LEARNING-TRAINED MODEL, ASSESSMENT SUPPORT METHOD, AND RECORDING MEDIUM

This application is a National Stage Entry of PCT/JP2021/020254 filed on May 27, 2021, the contents of all of which are incorporated herein by reference, in their entirety.

TECHNICAL FIELD

The present invention relates to technical fields of an assessment support system, an assessment support method, and a recording medium that support creation of an assessment, which is one of a nursing process related to a patient.

BACKGROUND ART

A system known for supporting a medical care and a treatment plan, defines a degree of similarity by using a symptom vector that is a quantified symptom of the patient, and detects a patient in the past for whom the symptom vector is similar to that of a target patient (e.g., see Patent Literature 1.).

CITATION LIST

Patent Literature

Patent Literature 1: JP2003-122845A

SUMMARY

Technical Problem

In an assessment described as one item of a nursing record, however, an analysis of a nursing plan for the patient and a description of a thought process thereof are required, for which multifaceted information about nursing, for example, about a nursing system and medical equipment or the like that can be provided to the patient as well as the patient's symptom, is desirably considered. For this reason, the content of an assessment of a second patient who is considered to be similar, in the symptom vector, to a first patient who is an assessment creation target, does not necessarily serve as a reference for an assessment to be described for the first patient. Therefore, in order to search for the second patient who is similar to the first patient for the purpose of supporting the creation of the assessment of the first patient, the above-mentioned system may have a low search performance and may not be sufficiently reliable as an assessment creation support.

It is an example object of the present disclosure to provide an assessment support system, an assessment support method, and a recording medium with enhanced reliability as the assessment creation support.

Solution to Problem

An assessment support system according to an example aspect of the present disclosure includes: an assessment prediction unit that predicts, based on patient information about a target patient who is a creation target for an assessment in a nursing record, an assessment vector obtained by vectorizing the assessment of the target patient, as a prediction assessment vector: a degree-of-similarity calculation unit that calculates a degree of similarity of the assessment vector to the prediction assessment vector, based on a relationship between the prediction assessment vector predicted and the assessment vector of a patient having the assessment recorded in the nursing record: and a search unit that searches for and outputs at least one similar patient who is similar to the target patient, based on the degree of similarity.

An assessment support method according to an example aspect of the present disclosure allows at least one computer to execute: predicting, based on patient information about a target patient who is a creation target for an assessment in a nursing record, an assessment vector obtained by vectorizing the assessment of the target patient, as a prediction assessment vector: calculating a degree of similarity of the assessment vector to the prediction assessment vector, based on a relationship between the prediction assessment vector predicted and the assessment vector of a patient having the assessment recorded in the nursing record: and searching for and outputting at least one similar patient who is similar to the target patient, based on the degree of similarity:

A recording medium according to an example aspect of the present disclosure is a recording medium on which a computer program is recorded, the computer program allowing at least one computer to function as: an assessment prediction unit that predicts, based on patient information about a target patient who is a creation target for an assessment in a nursing record, an assessment vector obtained by vectorizing the assessment of the target patient, as a prediction assessment vector: a degree-of-similarity calculation unit that calculates a degree of similarity of the assessment vector to the prediction assessment vector, based on a relationship between the prediction assessment vector predicted and the assessment vector of a patient having the assessment recorded in the nursing record: and a search unit that searches for and outputs at least one similar patient who is similar to the target patient, based on the degree of similarity.

According to the assessment support system, the assessment support method, and the recording medium in the respective example aspects described above, a performance of searching for a patient who is similar, in the assessment, to a target patient for whom an assessment is created, is increased, and it is thus possible to provide a reliable assessment creation support.

DESCRIPTION OF EXAMPLE EMBODIMENT

1. Overall Configuration

Figure 1:
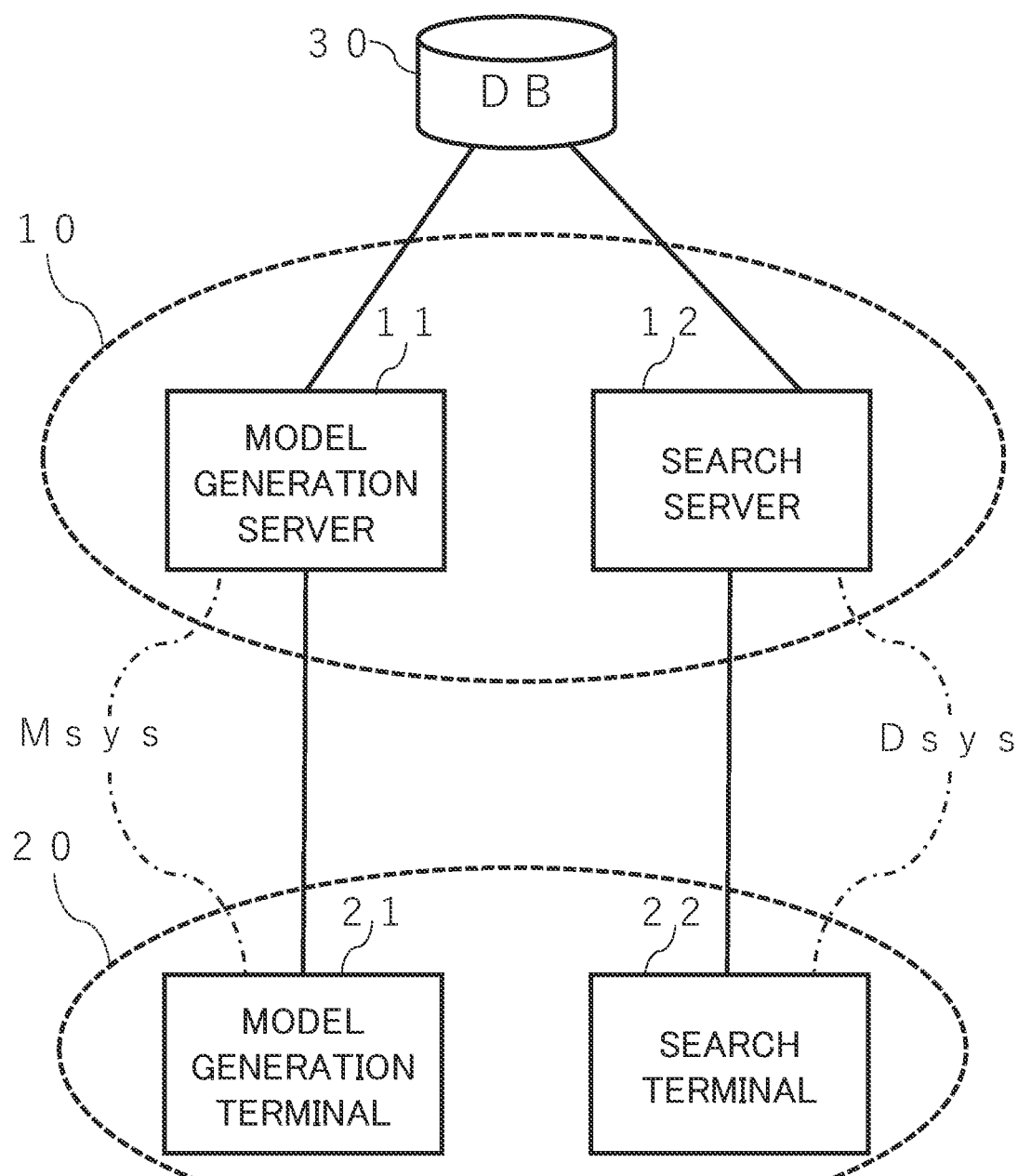
FIG. 1 is a diagram illustrating an example of an overall configuration for realizing an assessment support system according to the present disclosure.

FIG. 1 illustrates an example of an overall configuration for realizing an assessment support system Asys according to the present disclosure. The assessment support system Asys is a system that assists a health care worker (typically, a nurse, a nursing student, or the like, and hereinafter referred to as a "user") in creating assessment information. Here, the "assessment" is a description item included in "SOAP" that is one of methods of analyzing a nursing record that is recorded for nursing a patient. In the term "SOAP", "S" indicates subjective information on the patient, "O" indicates objective information, "A" indicates "assessment", and "P" indicates a nursing plan. The "assessment" describes judgment and evaluation derived by analyzing the subjective information (i.e. "S") and the objective information (i.e. "O"), and may also describe opinions, impressions, and the like. Hereinafter, text information described as the "assessment" in the nursing record will be referred to as "assessment information."

The assessment support system Asys may include a system server unit 10 and a system terminal unit 20 that are configured to transmit and receive data, as illustrated in FIG. 1, for example. The transmission and reception of data may be performed through a predetermined network, or directly: The system server unit 10 may include, for example, a model generation server 11 and a search server 12. The system terminal unit 20 may include, for example, a model generation terminal 21 and a search terminal 22. The model generation terminal 21 is accessible to the model generation server 11, and the model generation terminal 21 and the model generation server 11 may constitute a model generation system Msys. The model generation system Msys is, for example, a system that generates a prediction model described later, in response to operations by the user on the model generation terminal 21. The search terminal 22 is accessible to the search server 12, and the search terminal 22 and the search server 12 may constitute a search system Dsys. The search system Dsys is, for example, a system that searches for and presents a similar patient described later, to the user, in response to operations by the user on the search terminal 22.

The model generation server 11 and the search server 12 may, for example, be accessible to a database 30 that is also accessible from the other system. The database 30 may store various kinds of data, such as patient information about a plurality of patients, that may be generated and utilized in the other system (e.g., an electronic medical record system, etc.). The patient information is information recorded for each patient (i.e., known information), and may include, for example, a medical record created by doctors, examination data, and the nursing record for each patient. The patient information may also include, for example, an assessment created and recorded in the past with respect to the corresponding patient. The patient information may be associated with patient identification information for identifying each patient, for example. In the present system, for example, each patient may be identified by the patient identification in each process. Hereinafter, the patient for whom the assessment was created in the past and is recorded in the nursing record (i.e. the patient having the assessment information) will be referred to as a "past patient", and the patient for whom the assessment is to be created from now (i.e. a creation target) will be referred to as a "target patient".

The system server unit 10 may be configured as a so-called cloud server physically including a plurality of server apparatuses. Alternatively, the system server unit 10 may be configured by a physically single server apparatus. The model generation terminal 21 and the search terminal 22 may be integrated with the model generation server 11 and the search server 12, respectively, as described later. Furthermore, although FIG. 1 illustrates one model generation terminal 21 and one search terminal 22, there may be a plurality of them. Alternatively, the model generation terminal 21 and the search terminal 22 may be a physically single terminal.

2. Model Generation Server

Figure 2:
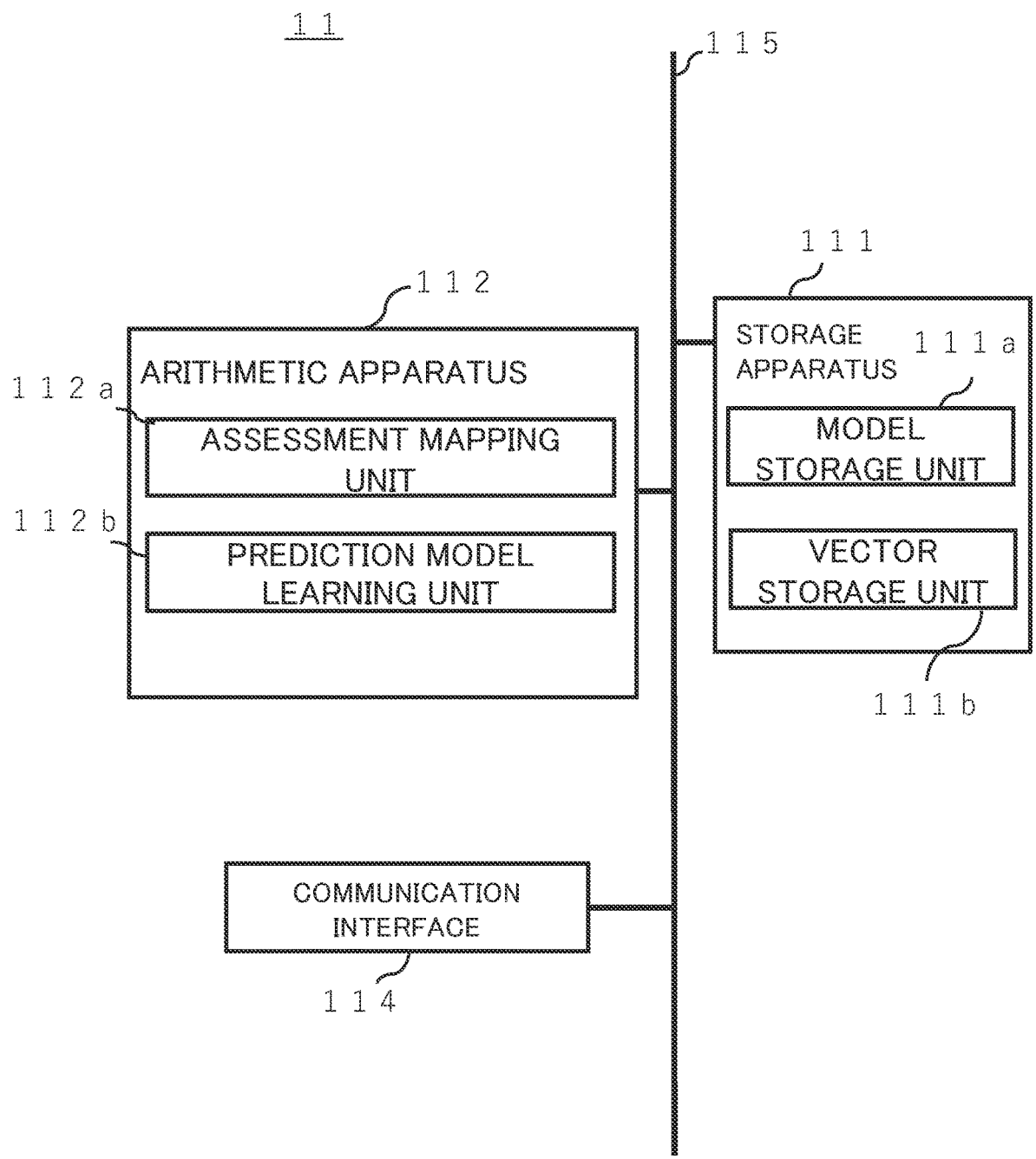
FIG. 2 is a diagram illustrating an example of a hardware configuration of a model generation server.

FIG. 2 illustrates an example of a hardware configuration of the model generation server 11. The model generation server 11 may include, for example, a storage apparatus 111, an arithmetic apparatus 112, and a communication interface 114. The storage apparatus 111, the arithmetic apparatus 112, and the communication interface 114 may be connected to transmit and receive data, through a data bus 115.

The storage apparatus 111 is configured to store desired data. For example, the storage apparatus 111 may temporarily store a computer program to be executed by the arithmetic apparatus 112. The storage apparatus 111 may temporarily store data to be temporarily used by the arithmetic apparatus 112 when the arithmetic apparatus 112 executes the computer program. The storage apparatus 111 may store data to be stored by the model generation server 11 for a long term. For example, the storage apparatus 111 may include a model storage unit 111a that stores the prediction model generated, and a vector storage unit 111b that stores an assessment vector about the past patient described later. The storage apparatus 111 may include at least one of a RAM (Random Access Memory), a ROM (Read Only Memory), a hard disk apparatus, a magneto-optical disk apparatus, and an SSD (Solid State Drive), and a disk array apparatus. That is, the storage apparatus 111 may include a volatile recording medium and a non-volatile recording medium.

The arithmetic apparatus 112 includes, for example, a CPU (Central Processing Unit). The arithmetic apparatus 112 reads the computer program. For example, the arithmetic apparatus 112 may read the computer program stored in the storage apparatus 111. For example, the arithmetic apparatus 112 may read the computer program that is computer-readable and stored in a non-volatile recording medium, by using a not-illustrated recording medium reading apparatus. The arithmetic apparatus 112 may obtain (i.e., download or read) through the communication interface 114, a computer program from a not-illustrated apparatus disposed outside the model generation server 11.

The arithmetic apparatus 112 executes the read computer program. Consequently, logical functional blocks for performing operations to be performed by the model generation server 11 are realized in the arithmetic apparatus 112. That is, the arithmetic apparatus 112 is capable of functioning as a controller for realizing the logical functional blocks for performing the operations to be performed by the model generation server 11. FIG. 2 illustrates an example of the logical functional blocks realized in the arithmetic apparatus 112 in order to realize each process to be performed by that the model generation server 11. As illustrated in FIG. 2, an assessment mapping unit 112a and a prediction model learning unit 112b are realized in the arithmetic apparatus 112. The arithmetic apparatus 112 obtains necessary data for processes related to each of the units 112a and 112b through, for example, the communication interface 114 and the data bus 115. The respective operations of the units 112a and 112b (i.e., processes performed by each of the units 112a and 112b) will be described later.

The communication interface 114, for example, accesses through communication lines, the other apparatuses, such as the model generation terminal 21, the database 30, another server in the system server unit 10 (e.g., the search server 12), an external system, and the like, to make it possible to transmit and receive various kinds of data with the other apparatuses.

3. Search Server

Figure 3:
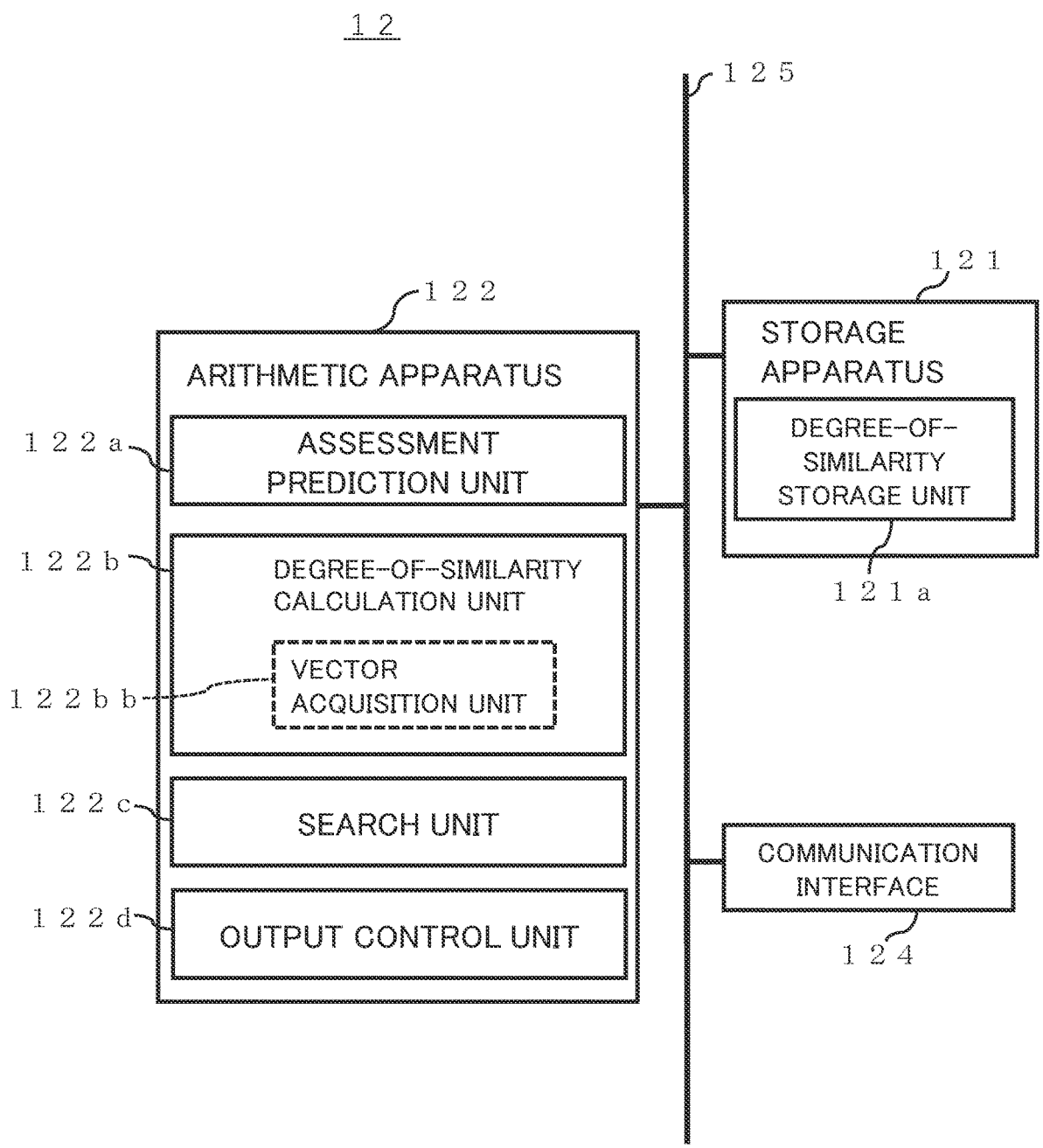
FIG. 3 is a diagram illustrating an example of a hardware configuration of a search server.

FIG. 3 illustrates an example of a hardware configuration of the search server 12. The search server 12 may include, for example, a storage apparatus 121, an arithmetic apparatus 122, and a communication interface 124. The storage apparatus 121, the arithmetic apparatus 122, and the communication interface 124 may be connected to transmit and receive data through a data bus 125.

The storage apparatus 121 is configured to store desired data. For example, the storage apparatus 121 may temporarily store a computer program to be executed by the arithmetic apparatus 122. The storage apparatus 121 may temporarily store data to be temporarily used by the arithmetic apparatus 122 when the arithmetic apparatus 122 executes the computer program. The storage apparatus 121 may store data to be stored by the search server 12 for a long term. For example, the storage apparatus 121 may include a degree-of-similarity storage unit 121*a* that stores a degree of similarity described later. The storage apparatus 121 may include at least one of a RAM, a ROM, a hard disk apparatus, a magneto-optical disk apparatus, a SSD, and a disk array apparatus. That is, the storage apparatus 121 may include a volatile recording medium and a non-volatile recording medium.

The arithmetic apparatus 122 includes, for example, a CPU. The arithmetic apparatus 122 reads the computer program. For example, the arithmetic apparatus 122 may read the computer program stored in the storage apparatus 121. For example, the arithmetic apparatus 122 may read a computer program that is computer-readable and stored in a non-volatile recording medium, by using a not-illustrated recording medium reading apparatus. The arithmetic apparatus 122 may obtain (i.e., download or read) through the communication interface 124, a computer program from a not-illustrated apparatus disposed outside the search server 12.

The arithmetic apparatus 122 executes the read computer program. Consequently, logical functional blocks for performing operations to be performed by the search server 12 are realized in the arithmetic apparatus 122. That is, the arithmetic apparatus 122 is capable of functioning as a controller for realizing the logical functional blocks for performing the operations to be performed by the search server 12. FIG. 3 illustrates an example of the logical functional blocks realized in the arithmetic apparatus 122 for each process to be performed by the search server 12. As illustrated in FIG. 3, an assessment prediction unit 122*a*, a degree-of-similarity calculation unit 122*b*, a search unit 122*c*, and an output control unit 122*d* are realized in the arithmetic apparatus 122, for example. The arithmetic apparatus 122 obtains, for example, through the communication interface 124 and the data bus 125, necessary data for processes related to each of the units 122*a* to 122*d*. The respective operations of the units 122*a* to 122*d* (i.e., processes performed by each of the units 122*a* to 122*d*) will be described later.

The communication interface 124, for example, accesses through communication lines the other apparatuses, such as the search terminal 22, the database 30, another server in the system server unit 10 (e.g., the model generation server 11), an external system, and the like, to make it possible to transmit and receive various kinds of data with the other apparatuses.

4. Model Generation Terminal

Figure 4:
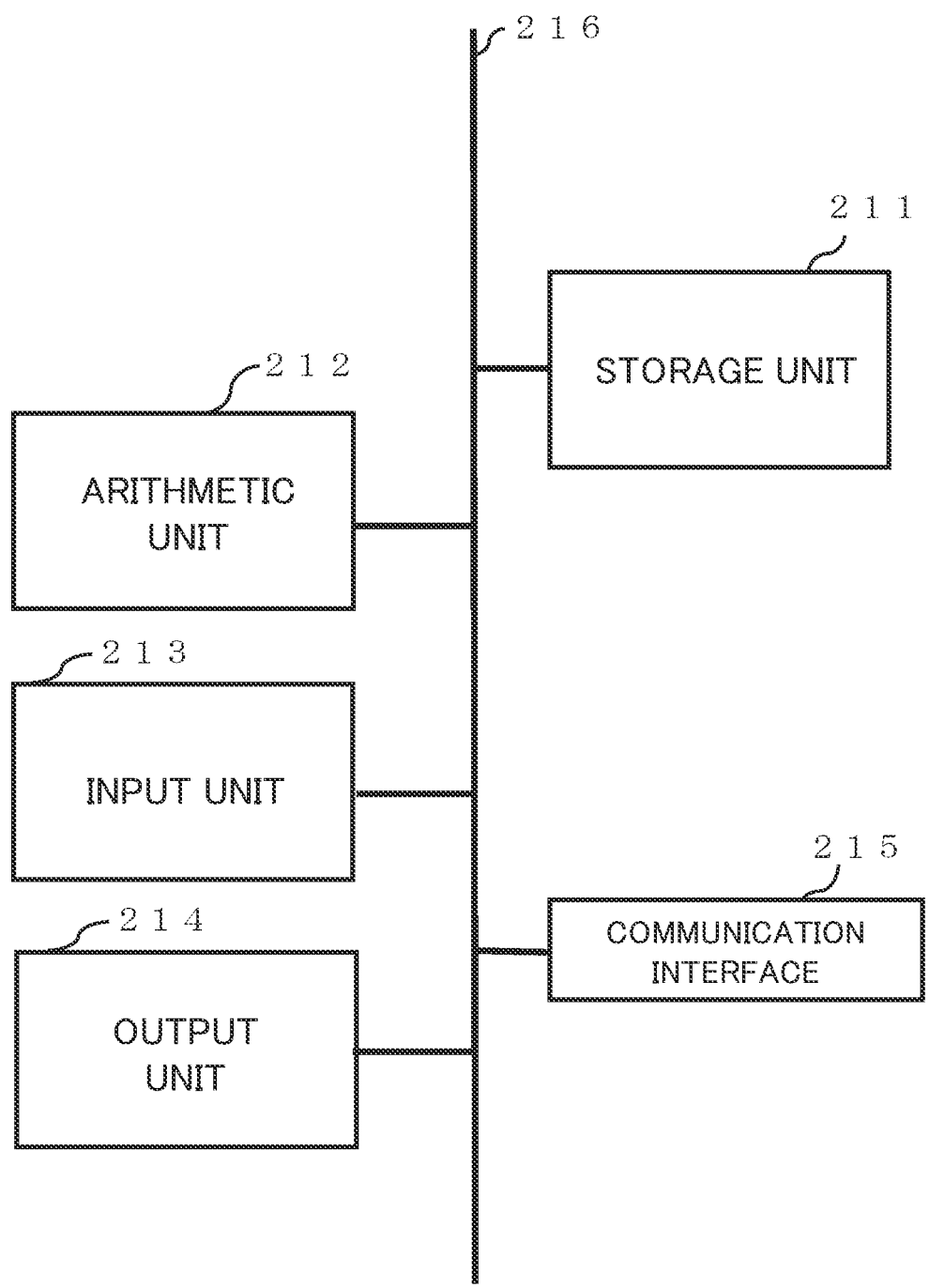
FIG. 4 is a diagram illustrating an example of hardware configurations of a model generation terminal and a search terminal.

The model generation terminal 21 functions as an interface of the model generation server 11 for the user. The model generation terminal 21 operates in response to input operations by the user and instructions from the model generation server 11. FIG. 4 illustrates an example of a hardware configuration of the model generation terminal 21. The model generation terminal 21 may include, for example, a storage unit 211, an arithmetic unit 212, an input unit 213, an output unit 214, and a communication interface 215. The storage unit 211, the arithmetic unit 212, the input unit 213, the output unit 214, and the communication interface 215 may be connected to transmit and receive data, through a data bus 216. The model generation terminal 21 may be provided to be integrated with the model generation server 11. In this case, for example, the input unit 213 and the output unit 214 may be connected to the data bus 115 of the model generation server 11. The respective functions of the storage unit 211 and the arithmetic unit 212 may be realized by the storage apparatus 111 and the arithmetic apparatus 112 of the model generation server 11, for example.

The storage unit 211 is configured to store desired data. For example, the storage unit 211 may temporarily store a computer program to be executed by the arithmetic unit 212. The storage unit 211 may temporarily store data to be temporarily used by the arithmetic unit 212 when the arithmetic unit 212 executes the computer program. The storage unit 211 may store data to be stored by the model generation terminal 21 for a long term. The storage unit 211 may include at least one of a RAM, a ROM, a hard disk apparatus, a magneto-optical disk apparatus, a SSD, and a disk array apparatus. In other words, the storage unit 211 may include a volatile recording medium and a nonvolatile recording medium The arithmetic unit 212, for example, includes a CPU. The arithmetic unit 212 reads the computer program. For example, the arithmetic unit 212 may read the computer program stored in the storage unit 211. For example, the arithmetic unit 212 may read the computer program that is computer-readable and stored in a non-volatile recording medium, by using a not-illustrated recording medium reading apparatus. The arithmetic unit 212 may obtain (i.e., download or read) through the communication interface 215, a computer program from a not-illustrated apparatus disposed outside the model generation terminal 21. The arithmetic unit 212 executes the read computer program. Consequently, logical functional blocks for performing operations to be performed by the model generation terminal 21 are realized in the arithmetic unit 212. That is, the arithmetic unit 212 is capable of functioning as a controller for realizing the logical functional blocks for performing operations to be performed by the model generation terminal 21.

The input unit 213 receives input operations from the outside (e.g., input operations by the user on the model generation terminal 21), and transmits operation information to the arithmetic unit 212 so as to perform processes corresponding to the input operations, for example. The arithmetic unit 212 may transmit the operation information transmitted from the input unit 213, to the model generation server 11 through the communication interface 215, for example. In addition, for example, the arithmetic unit 212 may perform processes corresponding to the operation information transmitted from the inputting unit 213, and may transmit a processing result to the model generation server 11 through the communication interface 215. The input mode of the input unit 213 may be the key input, the voice input, the touch input, the button input, or the like. The input unit 213 may include, for example, a keyboard, a mouse, a touch panel, a microphone, a button, and the like.

The output unit 214 outputs in a mode recognizable to the user, for example, instructions and various types of information transmitted from the model generation server 11, as appropriate. The output unit 214 may output in a mode recognizable to the user, for example, the processing result processed by the arithmetic unit 212, as appropriate. The output mode of the output unit 214 may be the visual output, the auditory output, the data output, or the like. The output unit 214 may include, for example, a screen, a speaker, a storage medium, and the like. The communication interface 215 accesses the model generation server 11, through communication lines for example, to make it possible to transmit and receive various kinds of data with the model generation server 11.

5. Search Terminal

The search terminal 22 functions as an interface of the search server 12 for the user. The search terminal 22 operates in response to input operations by the user and instructions from the search server 12. A hardware configuration of the search terminal 22 may be the same as the hardware configuration of the model generation terminal 21, except that the "model generation terminal 21" corresponds to the "search terminal 22" and the "model generation server 11" corresponds to the "search server 12" in the above descriptions about the model generation terminal 21. Therefore, descriptions of the hardware configuration of the search terminal 22 will be omitted.

6. Model Generation System

Referring back to FIG. 2, processes which are performed in the model generation system Msys will be described mainly on the respective operations of the assessment mapping unit 112a and the prediction model learning unit 112b realized in the arithmetic apparatus 112 of the model generation server 11.

The assessment mapping unit 112a may perform a vector generation process in response to a vector generation operation received by the input unit 213 of the model generation terminal 21, for example. The vector generation operation may be performed, for example, in timing when one or more assessments are newly created or updated. The assessment mapping unit 112a may vectorize real sentences created as the assessment (i.e., the assessment information) in the nursing record and may map it as an assessment vector in a multi-dimensional assessment space, as the vector generation process. The assessment mapping unit 112a may obtain the assessment information from the nursing record maintained in the database 30, for example. The assessment mapping unit 112a may use an already existing technique for vectorizing sentences in order to obtain the assessment vector from the assessment information. For example, BoW (Bag of Words), Word2vec, or the like may be adopted as the already existing technique. The assessment mapping unit 112a may store the assessment vector obtained by vectorizing the assessment information for each past patient, in the vector storage unit 111b of the storage apparatus 111, in association with the patient identification information, for example.

The prediction model learning unit 112b may perform a model learning process following the vector generation process, for example. Alternatively, the prediction model learning unit 112b may perform the model learning process in response to a model learning operation received by the input unit 213 of the model generation terminal 21, for example. The prediction model learning unit 112b learns a prediction model for predicting the assessment vector of the target patient, as the model learning process, for example. Hereinafter, the assessment vector predicted for the target person will be referred to as a "prediction assessment vector." The assessment vector obtained by the assessment mapping unit 112a and the prediction assessment vector may be vectors in the same assessment space. The prediction model may be, for example, a machine learning model for outputting the prediction assessment vector when the patient information about the target patient is inputted. As the model learning process, for example, the prediction model learning unit 112b may learn the model structure of the prediction model, by using the training data set including the patient information about the past patient as the input data and the assessment vector of the past patient as the correct answer data. The prediction model learning unit 112b may obtain the assessment vector of each past patient to be used as the correct answer data, from the vector storage unit 111b, and may obtain the patient information about each past patient to be used as the input data, from the database 30, for example. The prediction model learning unit 112b may adjust parameter values of the prediction model so as to reduce a difference between the prediction assessment vector outputted by the prediction model on the basis the patient information as the input data and the assessment vector as the correct answer data, i.e., so as to bring the outputted prediction assessment vector close to the assessment vector as the correct answer data, for example. The prediction model learning unit 112b may store the generated prediction model in the model storage unit 111a of the storage apparatus 111, for example.

Here, it is desirable that the "patient information" in the present system includes, in particular, at least one of physical information about a body, disease information about a disease or sickness, and past assessment information. The "physical information" may include, for example, vital values, age, height, weight, and the like. The "disease information" may include, for example, the name of a sickness, a stage of the sickness, and the like. The "past assessment information" is information related to the assessment information created in the past, and may be, for example, the assessment information itself or the assessment vector. Among pieces of information included in the patient information, especially, it is known that a coincidence level among the patients with respect to the above three elements has a significant relationship with the similarity level of the assessment information. For example, it is known that as the degree of coincidence with respect to the above three elements is higher the assessment information is more similar to the other one.

7. Search System

Next, processes which are performed in the search system Dsys will be described mainly on the respective operations of the assessment prediction unit 122a, the degree-of-similarity calculation unit 122b, the search unit 122c, and the output control unit 122d that are realized in the arithmetic apparatus 122 of the search server 12 illustrated in FIG. 3. The assessment prediction unit 122a, the degree-of-similarity calculation unit 122b, the search unit 122c, and the output control unit 122d may respectively perform the following processes in this order, in response to a search operation received by the input unit 213 of the search terminal 22, for example. The search operation may be performed in timing corresponding to the user's needs, for example.

The assessment prediction unit 122a predicts the assessment vector of the target patient from the patient information about the target patient, as the prediction assessment vector, for example. The prediction by the assessment prediction unit 122a may be performed, for example, by the prediction model learned by the prediction model learning unit 112b. The assessment prediction unit 122a may use the prediction model stored in the model storage unit 111a, for the prediction, for example. The assessment prediction unit 122a may obtain the patient information about the target patient from the database 30, for example.

The degree-of-similarity calculation unit 122b may calculate the degree of similarity of the assessment vector of each past patient to the prediction assessment vector, on the basis of a relationship in the assessment space between the prediction assessment vector and the assessment vector of each past patient, for example. The degree-of-similarity calculation unit 122b may include a vector acquisition unit 122bb that obtains the assessment vector of the past patient, for example. The vector acquisition unit 122bb may obtain the assessment vectors of all or a part of the past patients, with respect to the assessment vectors stored in the vector storage unit 111b, for example. Alternatively: the vector acquisition unit 122bb may obtain the assessment vector of the past patient by performing (or by allowing the assessment mapping unit 112a to perform) the vector generation process described above, for example. The degree-of-similarity calculation unit 122b may store the degree of similarity calculated for each past patient, in the degree-of-similarity storage unit 121a of the storage apparatus 121, in association with the patient identification information, for example. The degree-of-similarity calculation unit 122b may calculate the degree of similarity on the basis of Minkofsky distance (including Manhattan distance. Euclidean distance, and Chebyshev distance), a cosine similarity, and the like, for example.

Figure 5:
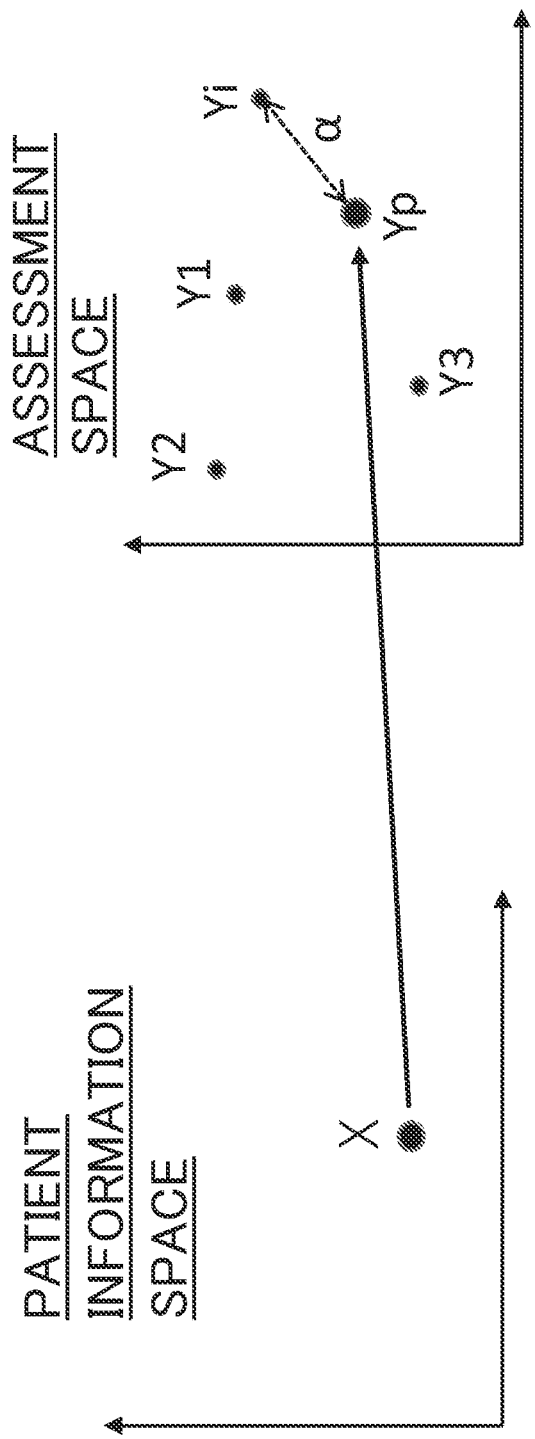
FIG. 5 is a diagram schematically illustrating a concept of a degree of similarity.

FIG. 5 schematically illustrates a concept of the degree of similarity in the relationship between the prediction assessment vector of the target patient and the assessment vector of the past patient. A patient information space shown on a left side in FIG. 5 is a space in which the patient information about the target patient is vectorized into an n-dimensional (two-dimensional in FIG. 5) patient information vector. As illustrated in FIG. 5, in the case of a two-dimensional patient information space, for example, an X-axis element may be set as a vital value, and a Y-axis element may be set as age. The position X in the patient information space indicates the patient information vector obtained from the patient information about the target patient, i.e., the position corresponding to the patient information about the target patient in the patient information space. On the other hand, an n-dimensional (two-dimensional in FIG. 5) assessment space is shown on a right side in FIG. 5. The position Yp in the assessment space indicates a prediction assessment vector value predicted from the patient information about the target patient. i.e., the position corresponding to the predicted assessment information about the target patient in the assessment space. The position Yi (i=1, 2, 3, and so on) in the assessment space indicates a value of the assessment vector obtained from the patient information about the past patient, i.e., the position corresponding to the assessment information about the past patient in the assessment space. As illustrated in FIG. 5, the degree of similarity may be a positional relation (a distance in FIG. 5) a between the position Yp that is the prediction assessment vector value in the assessment space and the position Yi that is the assessment vector value of the past patient. It may be determined that the degree of similarity is higher as the positional relationship a is closer or smaller. In the example illustrated in FIG. 5, the position Y1 is closer to the position Yp than the position Y2. Therefore, it may be determined that the degree of similarity of the assessment vector value Y1 is higher than the degree of similarity of the assessment vector value Y2.

The degree of similarity according to the present system may be a composite degree of similarity that is calculated in a complex manner in view of not only the prediction assessment vector of the target patient and the assessment vector of the past patient, but also the patient information about the target patient and the patient information about the past patient, for example. For example, the composite degree of similarity may be calculated by adding the degree of similarity in the assessment space to the degree of similarity in the patient information space. A technique adopted for the degree of similarity in the patient information space may be the same as, or different from, that for the degree of similarity in the assessment space.

The degree-of-similarity calculation unit 122b may calculate the composite degree of similarity such that the degree of similarity in the assessment space is adjusted by using the patient information, for example. Within the patient information, the degree-of-similarity calculation unit 122b may use assessment-related information (e.g., at least one of the physical information, the disease information, and the past assessment information) that is known for having a significant relationship with the similarity level of the assessment information, for example. For example, the degree-of-similarity calculation unit 122b may calculate the composite degree of similarity such that the degree of similarity in the assessment space is higher as the degree of coincidence with respect to the assessment-related information is higher. For example, the degree-of-similarity calculation unit 122b may set the degree of similarity to a lowest level (e.g., to be infinity when the degree of similarity is a distance), when the coincidence is failed with respect to at least a part of the assessment-related information. The degree-of-similarity calculation unit 122b may set weighting in accordance with the information included in the assessment-related information to calculate the composite degree of similarity: for example.

Referring back to FIG. 3, the search unit 122c searches for a similar patient who is similar to the target patient from the past patients, on the basis of the degree of similarity calculated by the degree-of-similarity calculation unit 122b, for example. For example, the search unit 122c may sort the respective degrees of similarity calculated for the past patients in descending order, and may output them as the similar patients. The search unit 122c may search for a predetermined number of past patients (e.g., 10 people) in the descending order with respect to the degree of similarity, and may specify them as the similar patients, for example. Alternatively, the search unit 122c may specify as the similar patients, for example, all of the past patients whose degree of similarity is greater than or equal to the degree of similarity that is a threshold (i.e., the past patients whose degree of similarity is greater than or equal to a predetermined value). The search unit 122c refers to the degree-of-similarity storage unit 121a to perform the search, for example. The search unit 122c may specify the similar patient on the basis of the above-described determination of the degree of similarity, for example. The number of people to be specified as the similar patient and the degree of similarity as the threshold, may be set by the user (e.g., the user who operates the search terminal 22), as appropriate. The search unit 122c may select a plurality of provisional similar patients by using only the degree of similarity in the assessment space, and may further extract the patients satisfying a predetermined condition by using the patient information (e.g., the assessment-related information having a significant relationship with the similarity level of the assessment information (e.g., at least one of the physical information, the disease information, and the past assessment information)) from the selected provisional similar patients, and may specify the patients satisfying the predetermined condition, as the similar patient, for example. The "predetermined condition" may be set such that the provisional similar patient with a relatively high degree of coincidence with respect to the assessment-related information may be relatively more easily specified as the similar patient, for example.

The output control unit 122d presents the similar patients specified by the search unit 122c, to the user of the search terminal 22. The power control unit 122d presents the similar patients (e.g., 10 people with a high degree of similarity) as a similar patient list, to the user of the search terminal 22, for example. The output controller 122d may display the similar patient list on the output unit 214 (e.g., a screen) of the search terminal 22, for example. The output control unit 122d may allow the user to select at least one similar patient from the displayed similar patient list, through the input unit 213 of the search terminal 22, for example. When at least one similar patient is selected, the output control unit 122d may obtain from the database 30, the assessment information about each selected similar patient, and may display it on the screen of the search terminal 22, and/or download it to the search terminal 22, for example. This allows the user to refer to the assessment information that is similar to the assessment information to be described for the target patient.

In the present system, as described above, a physically single server apparatus may function as the model generation server 11 and the search server 12. Furthermore, each of the model generation server 11 and the search server 12 may be realized by a plurality of server apparatuses. A common storage apparatus that is common to the model generation server 11 and the search server 12 may be provided, and data that are generated by the model generation server 11 and that are used by the search server 12 (e.g., the assessment vector of the past patient, etc.) may be held in this common storage apparatus.

According to the present system, it employs a concept of the assessment vector obtained by vectorizing the assessment in the nursing record in the multi-dimensional assessment space, and the similar patient is detected by using the degree of similarity that is obtained on the basis of the relationship between the assessment vector obtained from the actual assessment created in the past and the prediction assessment vector predicted for the target patient. Therefore, the content of the assessment of the similar patient with a high degree of similarity in the present system is more likely to be similar to the content to be described as the assessment of the target patient, than the content of the assessment of a patient who has only a similar symptom, for example. That is, the detected similar patient has a higher similarity level, in the content of the assessment, to the target patient, and the present system is allowed to provide higher reliability as the assessment creation support.

According to the present system, it is possible to predict the prediction assessment vector of the target patient by using the prediction model. The learning of the prediction model is performed by using the actual patient information and the assessment vector that is obtained from the assessment actually created in the past. Therefore, according to the present system, it is possible to predict the prediction assessment vector with high accuracy.

According to the present system, the degree of similarity obtained from only the relationship between the assessment vector and the prediction assessment vector may be adjusted by using a relationship between the patient information about the target patient and the patient information about the patient corresponding to the assessment vector. For example, in the patient information, if the coincidence level with respect to the information related to the similarity level of the assessment is considered, it is possible to further enhance an ability of searching for the similar patient.

For example, it is preferable that at least one of the physical information, the disease information and the past assessment information is included in the patient information that is considered when the degree of similarity is calculated. These three elements are known for having a significant relationship with the similarity level of the assessment. Therefore, it is possible to further enhance the ability of searching for the similar patient by calculating the degree of similarity in view of these elements.

The present system is configured to output the similar patients in descending order of the degree of similarity: This allows the user to more quickly recognize the similar patients with a high degree of similarity with respect to the assessment, and improves efficiency of the operation of searching for the similar patients. Furthermore/alternatively; the present system is configured to output the similar patient whose degree of similarity is greater than or equal to a predetermined value. This allows a reduction in an output processing load because an output process for patients whose degree of similarity is out of target range.

In addition, the present system that employs the concept of the assessment vector obtained by vectorizing the assessment in the nursing record in the multi-dimensional assessment space (i.e., mapping it in the multi-dimensional assessment space), may be configured to generate the assessment vector from the assessment actually created in the past (the assessment mapping unit), and to learn the prediction model for predicting the prediction assessment vector of the target patient who is the creation target of the assessment, by using the generated assessment vector (the prediction model learning unit). This allows the prediction based on the actually created assessment itself. Therefore, prediction accuracy is further enhanced, and it is possible to provide a highly reliable assessment support system.

Each process in the present system may be provided as a method to be executed by at least one computer. This allows a processing load to be distributed, for example. In addition, a computer program for realizing each process in the present system may be provided as a recording medium on which the computer program is recorded. This facilitates sales or updating of the computer program according to the present system, for example.

The present invention is not limited to the examples described above and is allowed to be changed, if desired, without departing from the essence or spirit of the present disclosure which can be read from the claims and the entire specification. An assessment support system, an assessment support method, and a recording medium with such changes are also intended to be within the technical scope of the present disclosure.

Supplementary Notes

With respect to the example embodiment described above, the following Supplementary Notes are further disclosed.

Supplementary Note 1

An assessment support system according to Supplementary Note 1 is an assessment support system including: an assessment prediction unit that predicts, based on patient information about a target patient who is a creation target for an assessment in a nursing record, an assessment vector obtained by vectorizing the assessment of the target patient, as a prediction assessment vector: a degree-of-similarity calculation unit that calculates a degree of similarity of the assessment vector to the prediction assessment vector, based on a relationship between the prediction assessment vector predicted and the assessment vector of a patient having the assessment recorded in the nursing record: and a search unit that searches for and outputs at least one similar patient who is similar to the target patient, based on the degree of similarity.

Supplementary Note 2

An assessment support system according to Supplementary Note 2 is the assessment support system according to Supplementary Note 1, wherein the assessment prediction unit predicts the prediction assessment vector from the patient information about the target patient, by using a prediction model for outputting the prediction assessment vector based on the patient information inputted, and the prediction model is a model learned by using the assessment vector and the patient information about the patient.

Supplementary Note 3

An assessment support system according to Supplementary Note 3 is the assessment support system according to Supplementary Note 1 or 2, wherein the degree-of-similarity calculation unit calculates the degree of similarity, by using the patient information about the target patient and the patient information about the patient.

Supplementary Note 4

An assessment support system according to Supplementary Note 4 is the assessment support system according to any one of Supplementary Notes 1 to 3, wherein the patient information includes at least one of physical information about a body, disease information about a disease or sickness, and past assessment information about the assessment created in the past, with respect to each patient.

Supplementary Note 5

An assessment support system according to Supplementary Note 5 is the assessment support system according to Supplementary Note 3 or 4, wherein the degree-of-similarity calculation unit calculates the degree of similarity in such a way that the degree of similarity is higher as a degree of coincidence between the patient information about the target patient and the patient information about the patient is higher.

Supplementary Note 6

An assessment support system according to Supplementary Note 6 is the assessment support system according to any one of Supplementary Notes 1 to 5, wherein the search unit outputs the at least one similar patient in descending order of the degree of similarity:

Supplementary Note 7

An assessment support system according to Supplementary Note 7 is the assessment support system according to any one of Supplementary Notes 1 to 6, wherein the search unit outputs the at least one similar patient, each for whom the degree of similarity is greater than or equal to a predetermined value.

Supplementary Note 8

An assessment support system according to Supplementary Note 8 is an assessment support system including: an assessment mapping unit that maps an assessment recorded in a nursing record of a patient, as an assessment vector, in an assessment space: and a prediction model learning unit that learns a prediction model which, when patient information about a target patient who is a creation target for the assessment is inputted, predicts the assessment vector of the target patient as a prediction assessment vector, by using the assessment vector of the patient and the patient information about the patient as a training data set.

Supplementary Note 9

An assessment support method according to Supplementary Note 9 is an assessment support method that allows at least one computer to execute: predicting, based on patient information about a target patient who is a creation target for an assessment in a nursing record, an assessment vector obtained by vectorizing the assessment of the target patient, as a prediction assessment vector: calculating a degree of similarity of the assessment vector to the prediction assessment vector, based on a relationship between the predicted prediction assessment vector and the assessment vector of a patient having the assessment recorded in the nursing record: and searching for and outputting at least one similar patient who is similar to the target patient, based on the degree of similarity:

Supplementary Note 10

A recording medium according to Supplementary Note 10 is a recording medium on which a computer program is recorded, the computer program allowing at least one computer to function as: an assessment prediction unit that predicts, based on patient information about a target patient who is a creation target for an assessment in a nursing record, an assessment vector obtained by vectorizing the assessment of the target patient, as a prediction assessment vector; a degree-of-similarity calculation unit that calculates a degree of similarity of the assessment vector to the prediction assessment vector, based on a relationship between the predicted prediction assessment vector and the assessment vector of a patient having the assessment recorded in the nursing record; and a search unit that searches for and outputs at least one similar patient who is similar to the target patient, based on the degree of similarity.

DESCRIPTION OF REFERENCE CODES

11 Model generation server
112a Assessment mapping unit
112b Prediction model learning unit
12 Search server
122a Assessment prediction unit
122b Degree-of-similarity calculation unit
122c Search unit
122d Output control unit
Asys Assessment support system

What is claimed is:

1. An assessment support system comprising:
at least one memory that is configured to store instructions; and
at least one processor that is configured to execute the instructions to:
generate a first plurality of assessment vectors from first patient information in first nursing records of a plurality of first patients by applying a word embedding model to the first patient information;
train a prediction model based on a training set comprising the first plurality of assessment vectors and the first patient information, wherein the prediction model is configured to receive patient information about a target patient as an input and output a predicted assessment vector of the target patient, wherein the training comprises adjusting parameter values of the prediction model to reduce a difference between:
a plurality of predicted assessment vectors output by the prediction model based on the first patient information being input into the prediction model, and
corresponding vectors from among the first plurality of assessment vectors;
input the patient information about the target patient into the trained prediction model, based on receiving operation information from a terminal, to obtain the predicted assessment vector of the target patient from the trained prediction model;
calculate a plurality of similarity scores between the predicted assessment vector of the target patient and a second plurality of assessment vectors corresponding to a plurality of second patients;
identify one or more patients from among the plurality of second patients having highest similarity scores, based on the plurality of similarity scores; and
retrieve assessment information associated with the identified one or more patients from a database and transmit the retrieved assessment information to the terminal to cause the terminal to display the retrieved assessment information on a screen for creating an assessment of the target patient, wherein the retrieved assessment information comprises at least one of: subjective information reported by the one or more patients, objective information recorded with respect to the one or more patients, or a nursing plan associated with the one or more patients.

2. The assessment support system according to claim 1, wherein the first patient information comprises at least one of physical information about a body, disease information about a disease or sickness, and past assessment information about the assessment created in the past, with respect to the plurality of first patients.

3. The assessment support system according to claim 1, wherein the at least one processor is configured to execute the instructions to calculate the plurality of similarity scores such that a similarity score is higher as a degree of coincidence increases between the patient information of the target patient and corresponding patient information of the plurality of second patients.

4. The assessment support system according to claim 1, wherein the at least one processor is configured to execute the instructions to identify the one or more patients in descending order of similarity scores of the identified one or more patients.

5. The assessment support system according to claim 1, wherein the at least one processor is configured to execute the instructions to identify the one or more patients based on similarity scores of the one or more patients being greater than or equal to a predetermined value.

6. An assessment support method that allows at least one computer to execute:
generating a first plurality of assessment vectors from first patient information in first nursing records of a plurality of first patients by applying a word embedding model to the first patient information;
training a prediction model based on a training set comprising the first plurality of assessment vectors and the first patient information, wherein the prediction model is configured to receive patient information about a target patient as an input and output a predicted assessment vector of the target patient wherein the training comprises adjusting parameter values of the prediction model to reduce a difference between:
a plurality of predicted assessment vectors output by the prediction model based on the first patient information being input into the prediction model, and
corresponding vectors from among the first plurality of assessment vectors;
inputting the patient information about the target patient into the trained prediction model, based on receiving operation information from a terminal, to obtain the predicted assessment vector of the target patient from the trained prediction model;
calculating a plurality of similarity scores between the predicted assessment vector of the target patient and a second plurality of assessment vectors corresponding to a plurality of second patients;
identifying one or more patients from among the plurality of second patients having highest similarity scores, based on the plurality of similarity scores; and
retrieving assessment information associated with the identified one or more patients from a database and transmit the retrieved assessment information to the terminal to cause the terminal to display the retrieved assessment information on a screen for creating an assessment of the target patient, wherein the retrieved assessment information comprises at least one of: subjective information reported by the one or more patients, objective information recorded with respect to the one or more patients, or a nursing plan associated with the one or more patients.

7. A non-transitory recording medium on which a computer program is recorded, the computer program allowing at least one computer to execute:

generating a first plurality of assessment vectors from first patient information in first nursing records of a plurality of first patients by applying a word embedding model to the first patient information;

training a prediction model based on a training set comprising the first plurality of assessment vectors and the first patient information, wherein the prediction model is configured to receive patient information about a target patient as an input and output a predicted assessment vector of the target patient wherein the training comprises adjusting parameter values of the prediction model to reduce a difference between:

a plurality of predicted assessment vectors output by the prediction model based on the first patient information being input into the prediction model, and corresponding vectors from among the first plurality of assessment vectors;

inputting the patient information about the target patient into the trained prediction model, based on receiving operation information from a terminal, to obtain the predicted assessment vector of the target patient from the trained prediction model;

calculating a plurality of similarity scores between the predicted assessment vector of the target patient and a second plurality of assessment vectors corresponding to a plurality of second patients;

identifying one or more patients from among the plurality of second patients having highest similarity scores, based on the plurality of similarity scores; and retrieving assessment information associated with the identified one or more patients from a database and transmit the retrieved assessment information to the terminal to cause the terminal to display the retrieved assessment information on a screen for creating an assessment of the target patient, wherein the retrieved assessment information comprises at least one of: subjective information reported by the one or more patients, objective information recorded with respect to the one or more patients, or a nursing plan associated with the one or more patients.

\* \* \* \* \*